(12) United States Patent
Yabe et al.

(10) Patent No.: US 9,353,503 B2
(45) Date of Patent: May 31, 2016

(54) WORK VEHICLE

(71) Applicant: KOMATSU LTD., Tokyo (JP)

(72) Inventors: Mitsuo Yabe, Hiratsuka (JP); Akihiro Ohsawa, Kanagawa (JP); Toshiya Shintani, Chigasaki (JP); Teruyuki Matsuki, Hadano (JP); Yoshiaki Yoshida, Hiratsuka (JP); Yosuke Yamagoe, Komatsu (JP); Masahiro Tazou, Komatsu (JP); Hiroyuki Kitaoka, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/380,786

(22) PCT Filed: Mar. 31, 2014

(86) PCT No.: PCT/JP2014/059425
§ 371 (c)(1),
(2) Date: Aug. 25, 2014

(87) PCT Pub. No.: WO2014/192405
PCT Pub. Date: Dec. 4, 2014

(65) Prior Publication Data
US 2015/0337520 A1 Nov. 26, 2015

(51) Int. Cl.
*B60K 11/02* (2006.01)
*E02F 9/08* (2006.01)
*B60K 11/06* (2006.01)
(Continued)

(52) U.S. Cl.
CPC ............... *E02F 9/0866* (2013.01); *B60K 11/02* (2013.01); *B60K 11/06* (2013.01); *E02F 3/3411* (2013.01); *B60K 13/04* (2013.01); *B60Y 2200/415* (2013.01); *F01P 5/06* (2013.01); *F01P 2001/005* (2013.01)

(58) Field of Classification Search
CPC ........ B60K 11/00; B60K 11/02; B60K 11/04; B60K 11/06; B60K 11/08; B60K 13/02; E02F 9/0858; E02F 9/08566; E02F 9/0866; E02F 3/3411
USPC ....................... 180/68.1, 68.2, 68.3
See application file for complete search history.

(56) References Cited

U.S. PATENT DOCUMENTS

| 4,757,858 A | 7/1988 | Miller et al. |
| 5,689,953 A | 11/1997 | Yamashita et al. |

(Continued)

FOREIGN PATENT DOCUMENTS

| CN | 1337523 A | 2/2002 |
| CN | 101440745 A | 5/2009 |

(Continued)

OTHER PUBLICATIONS

Manual translation of JP 60-79155, May 4, 1985.*
(Continued)

*Primary Examiner* — John Walters
(74) *Attorney, Agent, or Firm* — Global IP Counselors, LLP

(57) ABSTRACT

A wheel loader is provided with an engine compartment, a cooling compartment, a radiator, a cooling fan, a partition wall, a first duct body part, and a top plate. A first end part of the first duct body part is positioned inside the engine compartment. A second end part of the first duct body part is positioned inside the cooling compartment in front of the radiator and the cooling fan. A first outdoor air intake port formed in the top plate is formed in front of the radiator and the cooling fan.

12 Claims, 9 Drawing Sheets

(51) Int. Cl.
  *E02F 3/34* (2006.01)
  *F01P 5/06* (2006.01)
  *F01P 1/00* (2006.01)
  *B60K 13/04* (2006.01)

(56) References Cited

U.S. PATENT DOCUMENTS

| | | | | |
|---|---|---|---|---|
| 8,403,089 | B2 * | 3/2013 | Braun | B60K 11/08 |
| | | | | 180/68.1 |
| 8,453,776 | B2 * | 6/2013 | Neilson | B60K 11/04 |
| | | | | 180/68.1 |
| 9,033,081 | B1 * | 5/2015 | Yamagoe | B60K 11/02 |
| | | | | 180/68.1 |
| 2007/0007061 | A1 * | 1/2007 | Meyer | B60K 11/04 |
| | | | | 180/68.1 |

FOREIGN PATENT DOCUMENTS

| | | | | |
|---|---|---|---|---|
| DE | 102007049770 | A1 * | 4/2009 | ............ F01P 1/06 |
| JP | 60-79155 | A | 5/1985 | |
| JP | 11-22463 | A | 1/1999 | |
| JP | 2001-295650 | A | 10/2001 | |
| JP | 2004-1645 | A | 1/2004 | |
| JP | 2004-169518 | A | 6/2004 | |
| JP | 2007-283801 | A | 1/2007 | |
| JP | 2014-25254 | A | 2/2014 | |

OTHER PUBLICATIONS

The international search report for the corresponding international application No. PCT/JP2014/059425, issued on Jun. 24, 2014.

The Office Action for the corresponding Chinese application No. 2014800008355 issued on Apr. 6, 2016.

* cited by examiner

WORK VEHICLE

CROSS-REFERENCE TO RELATED APPLICATIONS

This application is a U.S. National stage application of International Application No. PCT/JP2014/059425, filed on Mar. 31, 2014.

BACKGROUND

1. Field of the Invention

The present invention relates to a work vehicle.

2. Background Information

A work vehicle is provided with an engine compartment. An engine is contained inside the engine compartment. Various devices other than the engine are also contained inside the engine compartment. For example, an exhaust gas post-processing device for processing exhaust gas from the engine is contained inside the engine compartment in the work vehicle disclosed in Japanese Patent Laid-open No. 2014-025254.

SUMMARY

When the engine or the various devices contained inside the engine compartment generate heat while operating, there is a problem that the temperature inside the engine compartment rises.

An object of the present invention is to suppress an excessive rise in temperature inside the engine compartment.

A work vehicle according to an aspect of the present invention is provided with an engine compartment, a cooling compartment, a radiator, a cooling fan, a partition wall, a first duct body part, and a vehicle body cover. The radiator is contained in the cooling compartment. The cooling fan is contained in the cooling compartment and exhausts air from the cooling compartment to the rear. The partition wall partitions the engine compartment from the cooling compartment. The first duct body part has a first end part and a second end part. The first end part is positioned inside the engine compartment. The second end part is positioned inside the cooling compartment in front of the radiator and the cooling fan. The vehicle body cover defines the cooling compartment. The vehicle body cover has an outdoor air intake port. The outdoor air intake port is formed in front of the radiator and the cooling fan.

According to this configuration, the second end part of the first duct body part is positioned in the cooling compartment. The cooling compartment is a space with negative pressure when the cooling fan is operating. As a result, the first duct body part sucks in air from the first end part and exhausts the air from the second end part. Consequently, hot air inside the engine compartment is exhausted to the cooling compartment and an excessive rise in temperature inside the engine compartment can be suppressed. Since negative pressure is developed the inside of the engine compartment due to the hot air inside the engine compartment being exhausted to the cooling compartment, outside air flows into the engine compartment and the inside of the engine compartment can be cooled.

The second end part and the outdoor air intake port are formed in front of the radiator and the cooling fan. As a result, hot air exhausted from the second end part becomes mixed with outdoor air sucked into the cooling compartment from the outdoor air intake port, and the mixed hot air and outdoor air flows toward the radiator. That is, direct flow of only the hot air exhausted from the second end part to the radiator can be suppressed. As a result, a reduction in the cooling efficiency of the radiator due to the hot air from the second end part can be suppressed.

The second end part is preferably disposed in a position that does not face the radiator in a back view. According to this configuration, the direct flow of the hot air exhausted from the second end part of the first duct body part onto the radiator can be suppressed. As a result, a reduction in the cooling efficiency of the radiator due to the hot air from the second end part can be further suppressed.

The work vehicle is preferably further equipped with a second duct body part. The second duct body part has a third end part and a fourth end part. The third end part is positioned inside the engine compartment. The fourth end part is positioned inside the cooling compartment in front of the radiator and the cooling fan. According to this configuration, hot air inside the engine compartment can be exhausted to the cooling compartment by both the first duct body part and the second duct body part. Consequently, an excessive rise in temperature inside the engine compartment can be further suppressed.

The fourth end part is preferably disposed in a position that does not face the radiator in the back view. According to this configuration, the direct flow of the hot air exhausted from the fourth end part of the second duct body part onto the radiator can be suppressed. As a result, a reduction in the cooling efficiency of the radiator due to the hot air from the fourth end part can be further suppressed.

The second end part preferably is positioned in an upper end part of the cooling compartment. The second end part is positioned on a first side relative to the center in the vehicle width direction. The fourth end part preferably is positioned in an upper end part of the cooling compartment. The fourth end part is positioned on a second side relative to the center in the vehicle width direction. According to this configuration, the second end part and the fourth end part can be spaced away from the center part of the radiator. As a result, hot air exhausted from the second and fourth end parts becomes mixed with outdoor air sucked into the cooling compartment from the outdoor air intake port, and the mixed hot air and outdoor air flows toward the center part of the radiator.

The second end part preferably is positioned in a first side end part and in an upper end part of the cooling compartment. The fourth end part is positioned in a second side end part and the upper end part of the cooling compartment.

The vehicle body cover preferably has a top plate that defines the upper surface of the engine compartment. The outdoor air intake port is formed in the tope plate.

The work vehicle preferably is further provided with a first member to be cooled and a first intake part. The first member to be cooled is disposed inside the engine compartment. The first intake part extends from the first end part of the first duct body part toward the first member to be cooled.

The first intake part is preferably attached in a removable manner to the first end part of the first duct body part. According to this configuration, the first intake part can be left inside the engine compartment when removing the first duct body part. As a result, the first intake part can be disposed inside a space interlaced inside the engine compartment. Consequently, even when the first member to be cooled is disposed in the interlaced space, the first intake part can be extended to the vicinity of the first member to be cooled to enable cooling of the first member to be cooled.

The work vehicle preferably is further provided with a second member to be cooled and a second intake part. The second member to be cooled is disposed inside the engine compartment. The second intake part extends from the first end part of the first duct body part toward the second member to be cooled. According to this configuration, even when the first member to be cooled and the second member to be cooled are disposed away from each other, both members to be cooled can be cooled.

A flow passage area in the first duct body part is preferably larger than a first flow passage area and larger than a flow passage area of the second intake part.

The second end part of the first duct body part preferably has an opening facing downwards. According to this configuration, even when rainwater intrudes into the cooling compartment, the rainwater can be prevented from intruding into the engine compartment through the first duct body part.

According to the present invention, an excessive rise in temperature inside the engine compartment can be suppressed.

DESCRIPTION OF EXEMPLARY EMBODIMENTS

Figure 1:
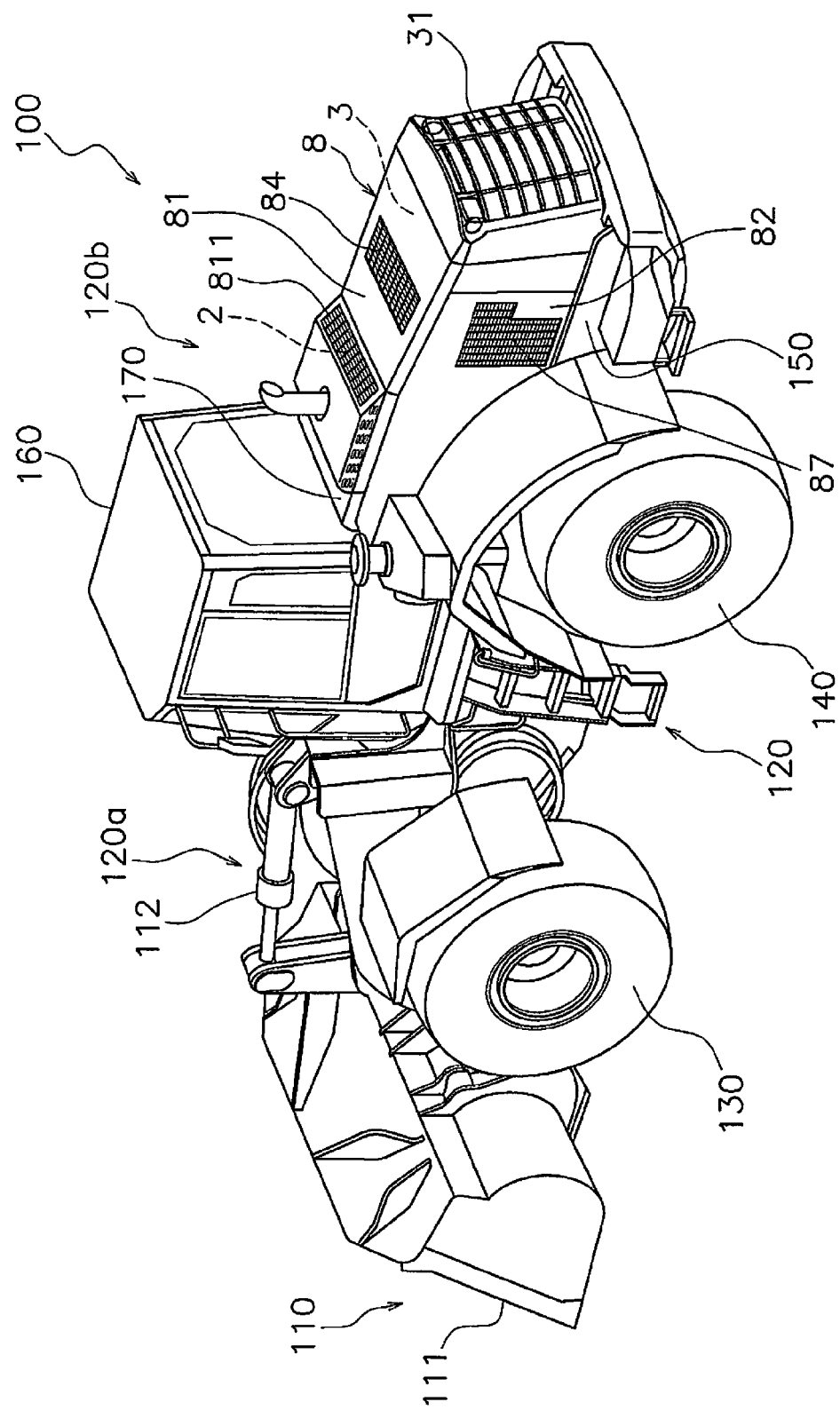
FIG. 1 is a perspective view of a wheel loader.

An exemplary embodiment of a wheel loader as an example of a work vehicle according to the present invention will be explained below with reference to the drawings. FIG. 1 is a perspective external view of a wheel loader 100 as seen from the left rear. In the following description, "right," "left," "up," and "down" indicate directions relative to a state of looking forward from the driver's seat. "Vehicle width direction" and "crosswise direction" have the same meaning. Moreover, the front-back direction signifies the front-back direction of the vehicle body.

As illustrated in FIG. 1, a wheel loader 100 includes a work implement 110, a vehicle body 120, front wheels 130, and rear wheels 140. The wheel loader 100 is capable of traveling due to the rotation of the front wheels 130 and the rear wheels 140, and desired work can be conducted using the work implement 110.

The work implement 110 is a mechanism driven by operating fluid pressurized by a hydraulic pump, and is disposed at the front of the vehicle body 120. The work implement 110 includes a bucket 111, a boom (not shown), a lift cylinder (not shown), and a bucket cylinder 112. The bucket 111 is attached to the tip of the boom. The boom is a member for lifting the bucket 111 and is mounted at the front part of a below mentioned front vehicle part 120a. The lift cylinder drives the boom with pressure oil discharged from a work implement pump. The bucket cylinder 112 drives the bucket 111 with pressure oil discharged from the work implement pump.

The vehicle body 120 has the front vehicle part 120a and a rear vehicle part 120b. The front vehicle part 120a and the rear vehicle part 120b are connected to each other to allow swinging in the left-right direction. The work implement 110 and the front wheels 130 are provided on the front vehicle part 120a, and the rear wheels 140 are provided on the rear vehicle part 120b.

Figure 2:
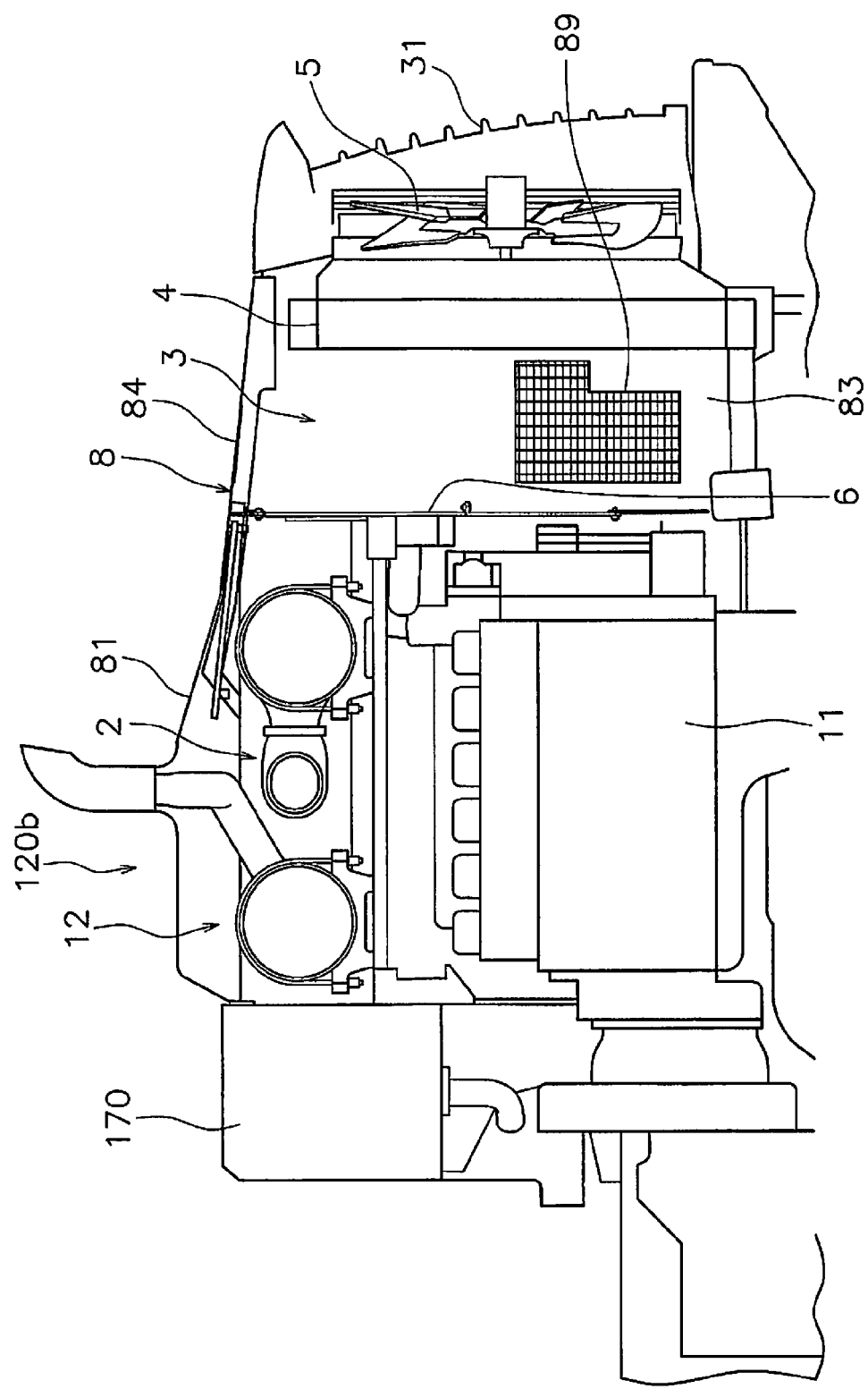
FIG. 2 is side cross-sectional view of a rear vehicle part.

The rear vehicle part 120b has a vehicle frame 150, a cab 160, a hydraulic fluid tank 170, an engine compartment 2, a cooling compartment 3, and a cooling fan 5 (see FIG. 2). The vehicle frame 150 is a frame that mainly configures the rear vehicle part 120b and supports the rear wheels 140, the cab 160, the hydraulic fluid tank 170, and an engine 11 and the like.

An operating cabin is provided inside the cab 160, and various operating members and an operating panel are provided inside the cab 160. The operating fluid tank 170 is disposed to the rear of the cab 160, and a plurality of hydraulic pumps (not shown) are disposed below the operating fluid tank 170. Operating fluid for driving the work implement 110 and the like is accumulated in the operating fluid tank 170, and the operating fluid is supplied to the work implement 110 and the like by the hydraulic pumps.

FIG. 2 is a side cross-section of the rear vehicle frame 120b as seen from the left. As illustrated in FIG. 2, the engine compartment 2 is disposed to the rear of the hydraulic fluid tank 170 and is defined by a vehicle body cover 8.

As illustrated in FIG. 1, the vehicle body cover 8 has a top plate 81, a first side plate 82, and a second side plate 83 (see FIG. 2). The upper plate 81 defines the upper surface of the engine compartment 2. The first and second side plates 82 and 83 define the side surfaces of the engine compartment 2. Specifically, the first side plate 82 defines the left side surface of the engine compartment 2, and the second side plate 83 defines the right side surface of the engine compartment 2.

As illustrated in FIG. 2, the engine 11 and an exhaust gas post-processing device 12 and the like are contained inside the engine compartment 2. The engine 11 is disposed in a lower part of the engine compartment 2 and is an engine in which the crankshaft extends in the front-back direction, that is, a so-called vertical mounted engine.

Figure 3:
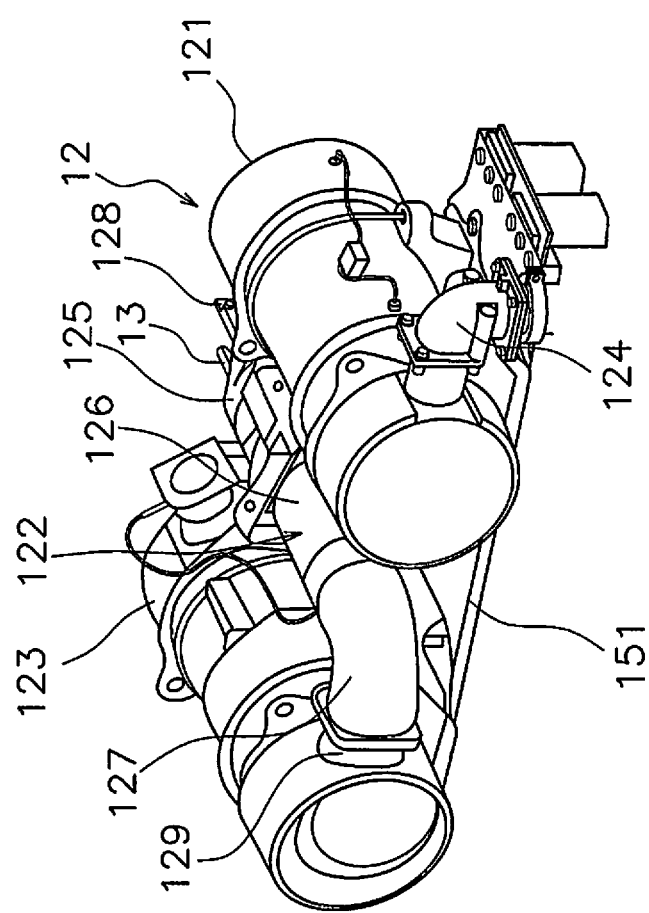
FIG. 3 is a perspective view of an exhaust gas post-processing device.

The exhaust gas post-processing device 12 is disposed in an upper part of the engine compartment 2. Specifically, the exhaust gas post-processing device 12 is disposed above the engine 11. FIG. 3 is a perspective view of the exhaust gas post-processing device 12 as seen from the left rear. As illustrated in FIG. 3, the exhaust gas post-processing device 12 includes, in order of the flow of exhaust gas, a diesel particulate filtering device 121, a connecting pipe 122, and a selective catalyst reduction device 123. A urea water injection device 13 is attached to the connecting pipe 122.

The diesel particulate filtering device 121 is connected to the engine 11 through a pipe 124. The diesel particulate filtering device 121 is a device for treating exhaust from the engine 11. Specifically, the diesel particulate filtering device 121 is a device that collects, in a filter, particulate matter, such as soot, in the exhaust gas emitted from the engine 11. The diesel particulate filtering device 121 burns the collected particulate matter with a heater provided with the filter. The diesel particulate filtering device 121 is supported by a supporting member 151 attached to the vehicle frame 150.

The connecting pipe 122 is a pipe for connecting the diesel particulate filtering device 121 and the selective catalyst reduction device 123. The entire connecting pipe 122 is formed in an S shape and includes a first bend section 125, a linear section 126, and a second bend section 127. The first bend section 125 is connected to an exhaust gas lead-out port 128 of the diesel particulate filtering device 121. The second bend section 127 is connected to an exhaust gas inlet port 129 of the selective catalyst reduction device 123. The linear section 126 extends between the first bend section 125 and the second bend section 127.

The urea water injection device 13 is attached to the first bend section 125. The urea water injection device 13 injects a urea water aqueous solution into the connecting pipe 122. The urea water aqueous solution is sucked up from a urea water aqueous solution tank (not shown) by a pump (not shown) and is supplied to the urea water injection device 13 via a pipe (not shown). The urea water aqueous solution injected into the connecting pipe 122 undergoes hydrolysis due to the heat from the exhaust gas and becomes ammonia. The ammonia is fed with the exhaust gas through the connecting pipe 122 to the selective catalyst reduction device 123.

The above-mentioned ammonia is used as a reducing agent to purify by reduction the nitrogen oxides in the exhaust gas in the selective catalyst reduction device 123. The selective catalyst reduction device 123 is supported by the supporting member 151 in the same way as the diesel particulate filtering device 121.

The diesel particulate filtering device 121 and the selective catalyst reduction device 123 are disposed parallel to each other. Specifically, the diesel particulate filtering device 121 and the selective catalyst reduction device 123 both have substantially tubular shapes. The center axes of the diesel particulate filtering device 121 and the selective catalyst reduction device 123 are both substantially disposed to extend substantially parallel to each other in the vehicle width direction. The linear section 126 in the connecting pipe 122 also has a substantially tubular shape and the center axis thereof extends in the vehicle width direction. Specifically, the center axis of the linear section 126 of the connecting pipe 122 is disposed substantially parallel to the center axes of the diesel particulate filtering device 121 and the selective catalyst reduction device 123.

The cooling compartment 3 is disposed to the rear of the engine compartments as illustrated in FIG. 2. The engine compartment 2 and the cooling compartment 3 are partitioned by a partition wall 6. The cooling compartment 3 is defined by the vehicle body cover 8 in the same way as the engine compartment 2. Specifically, the upper surface of the cooling compartment 3 is defined by the top plate 81 and the sides of the cooling compartment 3 are defined by the first and second side plates 82 and 83.

Specifically, a front part of the top plate 81 defines the upper surface of the engine compartment 2, and a rear part of the top plate 81 defines the upper surface of the cooling compartment 3. The front parts of the first and second side plates 82 and 83 define the side surfaces of the engine compartment 2, and the rear parts of the first and second side plates 82 and 83 define the side surfaces of the cooling compartment 3.

A radiator 4 and a cooling fan 5 are contained inside the cooling compartment 3. The radiator 4 cools cooling water for the engine 11. The cooling fan 5 exhausts air from inside the cooling compartment 3 to the outside of the cooling compartment 3. Specifically, the cooling fan 5 rotates to exhaust air from inside the cooling compartment 3 to the outside of the cooling compartment 3 via a grille 31. That is, the cooling fan 5 rotates to exhaust the air inside the cooling compartment 3 to the rear. Specifically, the cooling fan 5 generates an air flow toward the rear. The cooling fan 5 is disposed to the rear of the radiator 4. A grille 31 defines the rear surface of the cooling compartment 3.

Figure 4:
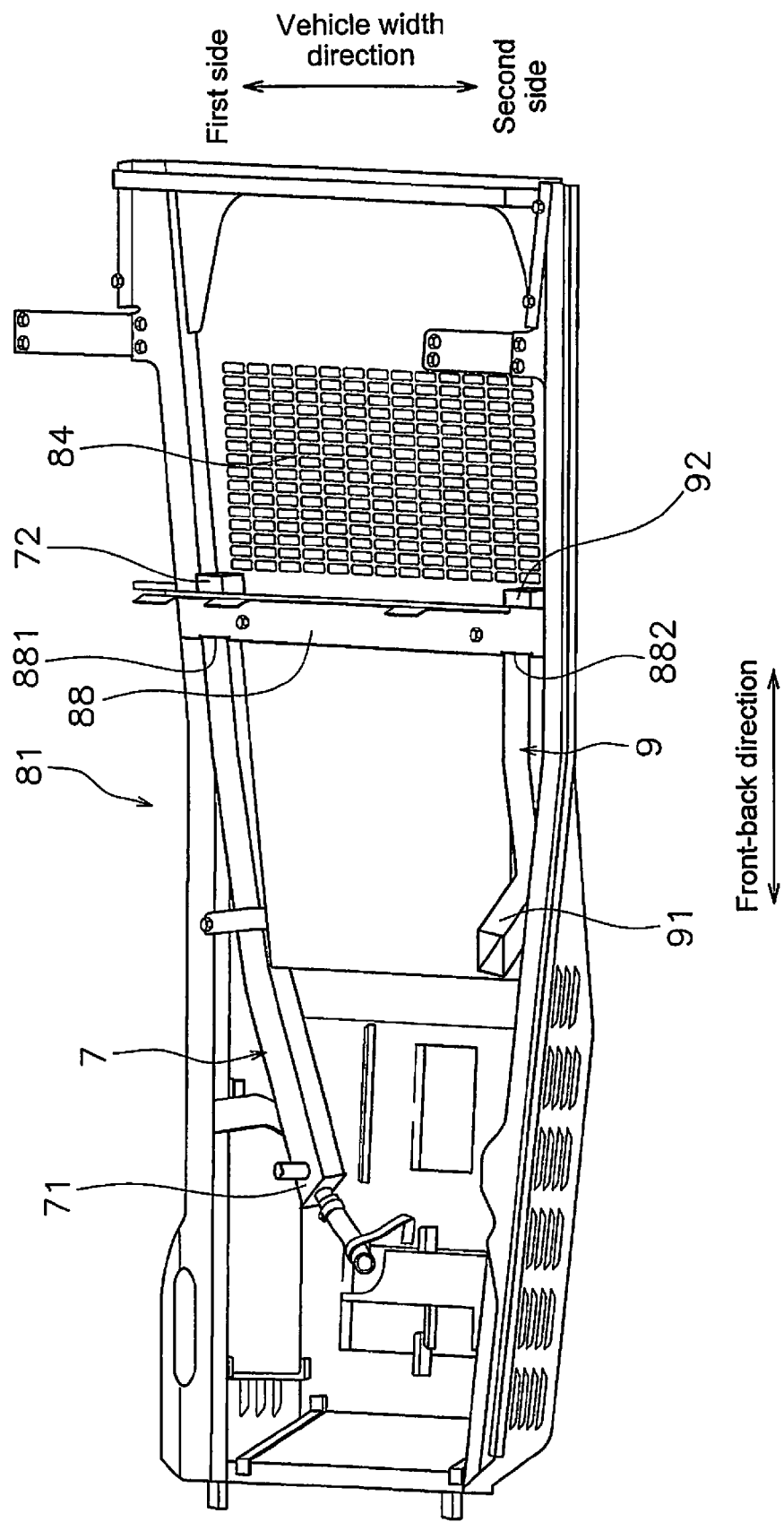
FIG. 4 is a perspective view of a top plate as seen from the underside.
Figure 5:
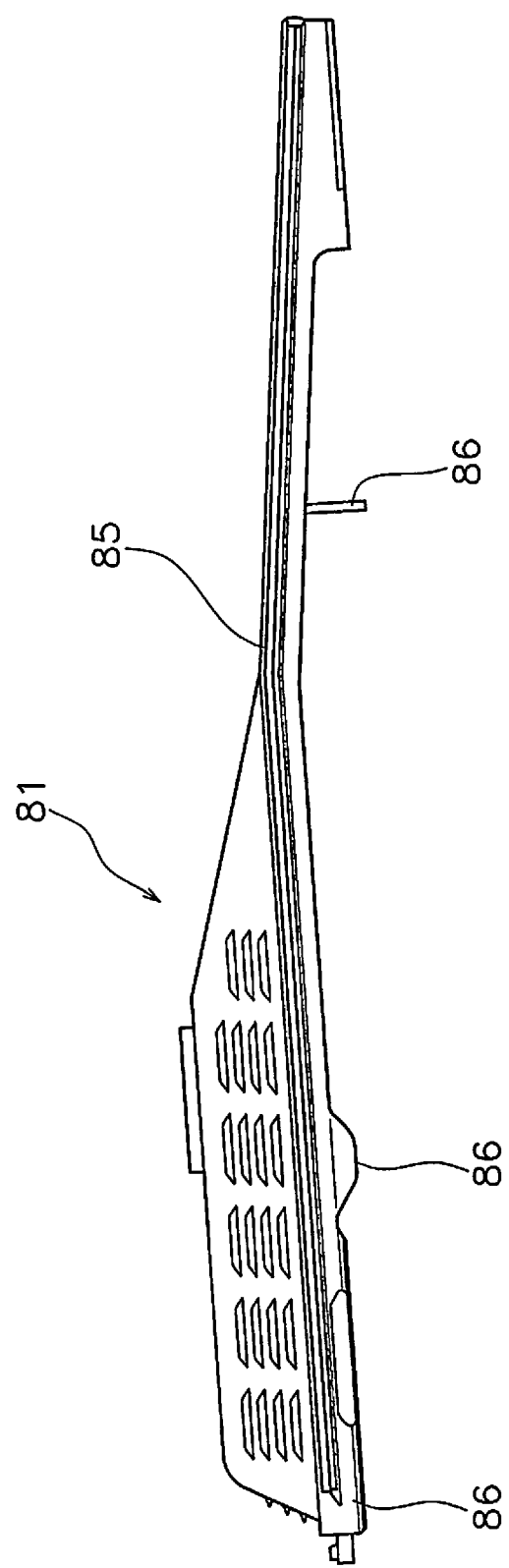
FIG. 5 is a side view of a top plate.

FIG. 4 is a perspective view of the underside of the top plate 81 and FIG. 5 is a side view of the top plate 81. As illustrated in FIGS. 4 and 5, the top plate 81 is a member that can be removed. Specifically, the top plate 81 is supported in a removable manner on the vehicle frame 150. While not limited in particular, the top plate 81 is attached to the vehicle frame 150 by a fastening member, such as a bolt. Specifically, a front part of the top plate 81 defines the upper surface of the engine compartment 2, and a rear part of the top plate 81 defines the upper surface of the cooling compartment 3.

The front part of the top plate 81 is formed to protrude upward. The rear part of the top plate 81 has a first outdoor air intake port 84 formed therein. The first outdoor air intake port 84 is an opening part for sucking in outdoor air into the cooling compartment 3. The cooling compartment 3 communicates with the outside through the first outdoor air intake port 84.

The first outdoor air intake port 84 is positioned in front of the radiator 4 and the cooling fan 5 in the front-back direction while the top plate 81 is attached to the vehicle frame 150. The first outdoor air intake port 84 is positioned on the upper surface of the cooling compartment 3 and allows communication between the cooling compartment 3 and the outside while the top plate 81 is attached to the vehicle frame 150. The front end of the first outdoor air intake port 84 is positioned to the rear of the partition wall 6 in the front-back direction, and the rear end of the first outdoor air intake port 84 is positioned in front of the radiator 4 in the front-back direction. The first outdoor air intake port 84 is configured of a plurality of through-holes. The first outdoor air intake port 84 has a substantially rectangular shape as seen in a plan view.

Figure 6:
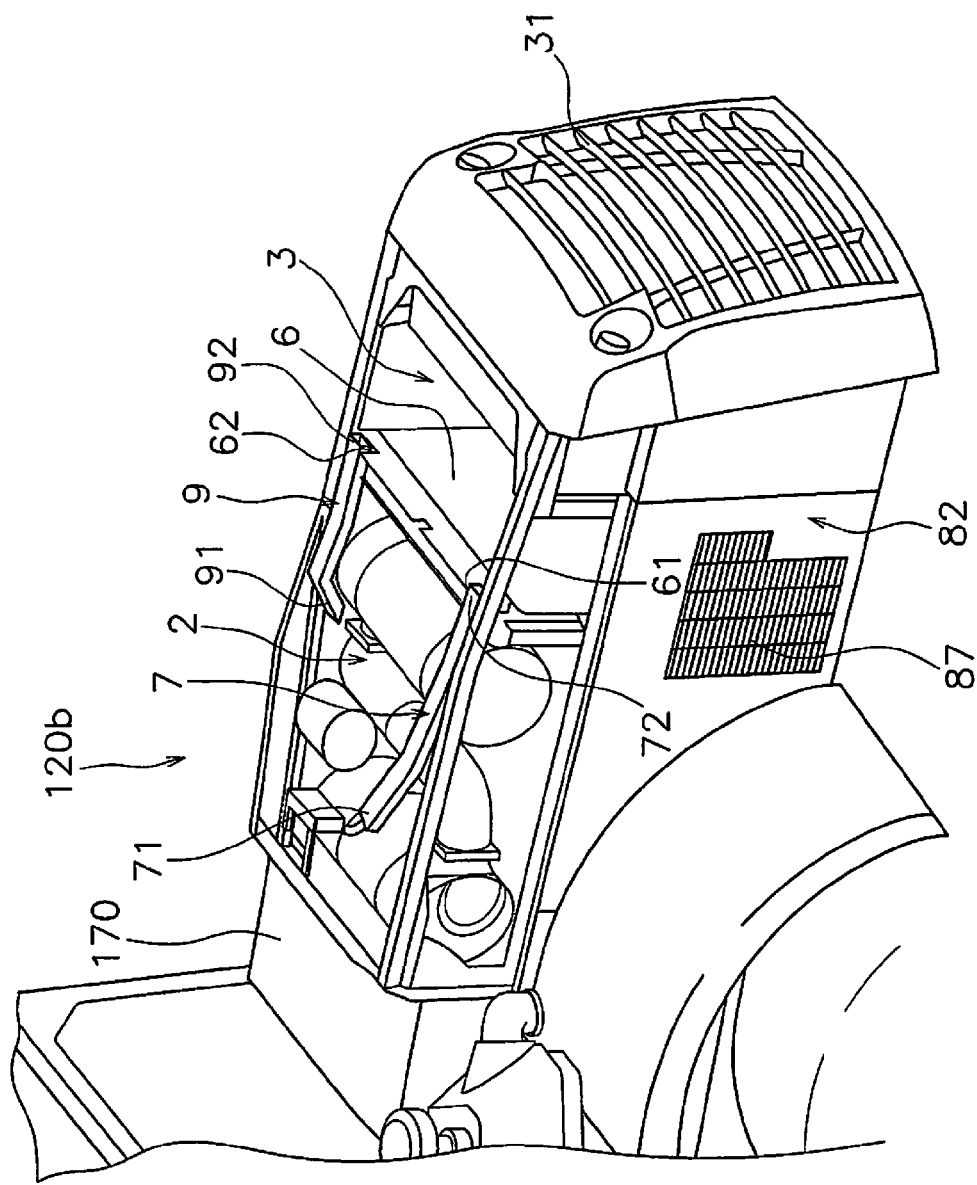
FIG. 6 is a perspective view of a rear vehicle part.

FIG. 6 is a perspective view of a rear vehicle body when the top plate 81 is removed. As illustrated in FIG. 6, a second outdoor air intake port 87 is formed in a first side plate 82 that is a portion of the vehicle body cover 8. The second outdoor air intake port 87 is an opening part for sucking in outdoor air into the cooling compartment 3. The cooling compartment 3 communicates with the outside through the second outdoor air intake port 87.

The second outdoor air intake port 87 is positioned in front of the radiator 4 and the cooling fan 5 in the front-back direction. Specifically, at least a portion of the second outdoor air intake port 87 is positioned in front of the radiator 4. The second outdoor air intake port 87 is positioned on the left side surface (example of the first side surface) of the cooling compartment 3 and allows communication between the cooling compartment 3 and the outside. The second outdoor air intake port 87 is configured of a plurality of through-holes. A third outdoor air intake port 89 (see FIG. 2) is formed in the second side plate 83 that defines the right side surface (example of the second side surface) of the cooling compartment 3. A detailed explanation of the third outdoor air intake port 89 is omitted because the configuration thereof is the same as that of the second outdoor air intake port 87.

As illustrated in FIG. 5, the top plate 81 has the top plate body part 85 and a plurality of leg parts 86. The top plate body part 85 is a portion that defines the upper surfaces of the engine compartment 2 and the cooling compartment 3. The leg parts 86 are portions that extend downward from the side edges of the top plate body part 85. A lower end of a below-mentioned first duct body part 7 is positioned higher than a lower end of the leg parts 86. As a result, when the top plate 81 is removed and placed on the ground, the leg parts 86 touch the ground and the first duct body part 7 does not touch the ground. A lower end of a second duct body part 9 is also positioned higher than the lower end of the leg parts 86. As a result, when the top plate 81 is removed and placed on the ground, the leg parts 86 touch the ground and the second duct body part 9 does not touch the ground.

As illustrated in FIG. 6, the wheel loader 100 is further provided with first and second duct body parts 7 and 9. The first and second duct body parts 7 and 9 extend to cross between the engine compartment 2 and the cooling compartment 3. Specifically, the first and second duct body parts 7 and 9 extend to pass through the partition wall 6.

The first duct body part 7 has first and second end parts 71 and 72. The first end part 71 of the first duct body part 7 is positioned inside the engine compartment 2. The second end part 72 of the first duct body part 7 is positioned inside the cooling compartment 3. The second end part 72 is positioned in front of the radiator 4 and the cooling fan 5 in the front-back direction. Specifically, the second end part 72 is positioned near the partition wall 6.

Figure 7:
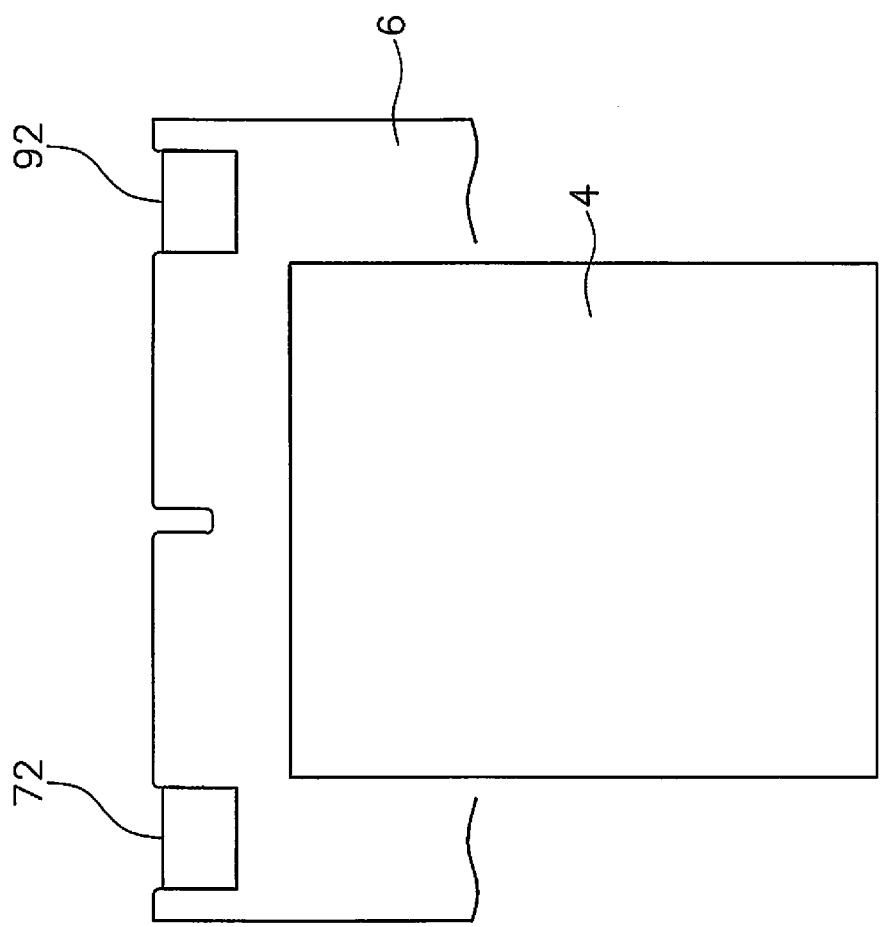
FIG. 7 is a schematic view of a positional relationship between the second end part and the fourth end part and a radiator.

As illustrated in FIG. 7, the second end part 72 is disposed in a position that does not face the radiator 4 in the back view. Specifically, the second end part 72 is positioned in the upper end part and on the left side (the first side) of the center in the vehicle width direction inside the cooling compartment 3. Specifically, the second end part 72 is positioned in an upper end part and a left side end part (example of the first side end part) inside the cooling compartment 3. That is, the second end part 72 is positioned near the first outdoor air intake port 84 and the second outdoor air intake port 87. FIG. 7 is a schematic view depicting a positional relationship between the radiator 4 and the duct body parts in the back view.

As illustrated in FIG. 4, the first duct body part 7 is attached to the top plate 81. Specifically, the first duct body part 7 is attached to the top plate 81 by a fixing means, such as a mounting bracket or by welding and the like. The first duct body part 7 can be integrally removed with the top plate 81 by removing the top plate 81 from the vehicle frame 150.

Specifically, the rear end part of the first duct body part 7 is supported by a beam member 88. The beam member 88 is fixed to the top plate body part 85. The beam member 88 extends in the vehicle width direction, and more specifically, extends from the left side end part (example of the first side end part) to the right side end part (example of the second side end part) of the top plate body part 85.

The beam member 88 has first and second through-holes 881 and 882 that run in the front-back direction. The first through-hole 881 is formed in the left side end part and the second through-hole 882 is formed in the right side end part. The first duct body part 7 is supported on the beam member 88 by passing through the first through-hole 881. A portion of the left side surface of the first duct body part 7 is welded to the inside surface of the top plate 81.

The first duct body part 7 is disposed in the left side end part (example of the first side end part) inside the engine compartment 2. The cross-section of the first duct body part 7 vertical to the longitudinal direction has a rectangular shape. The first duct body part 7 extends substantially in the front-back direction. The first duct body part 7 approaches the middle in the vehicle width direction as the first duct body part 7 extends to the front.

Figure 8:
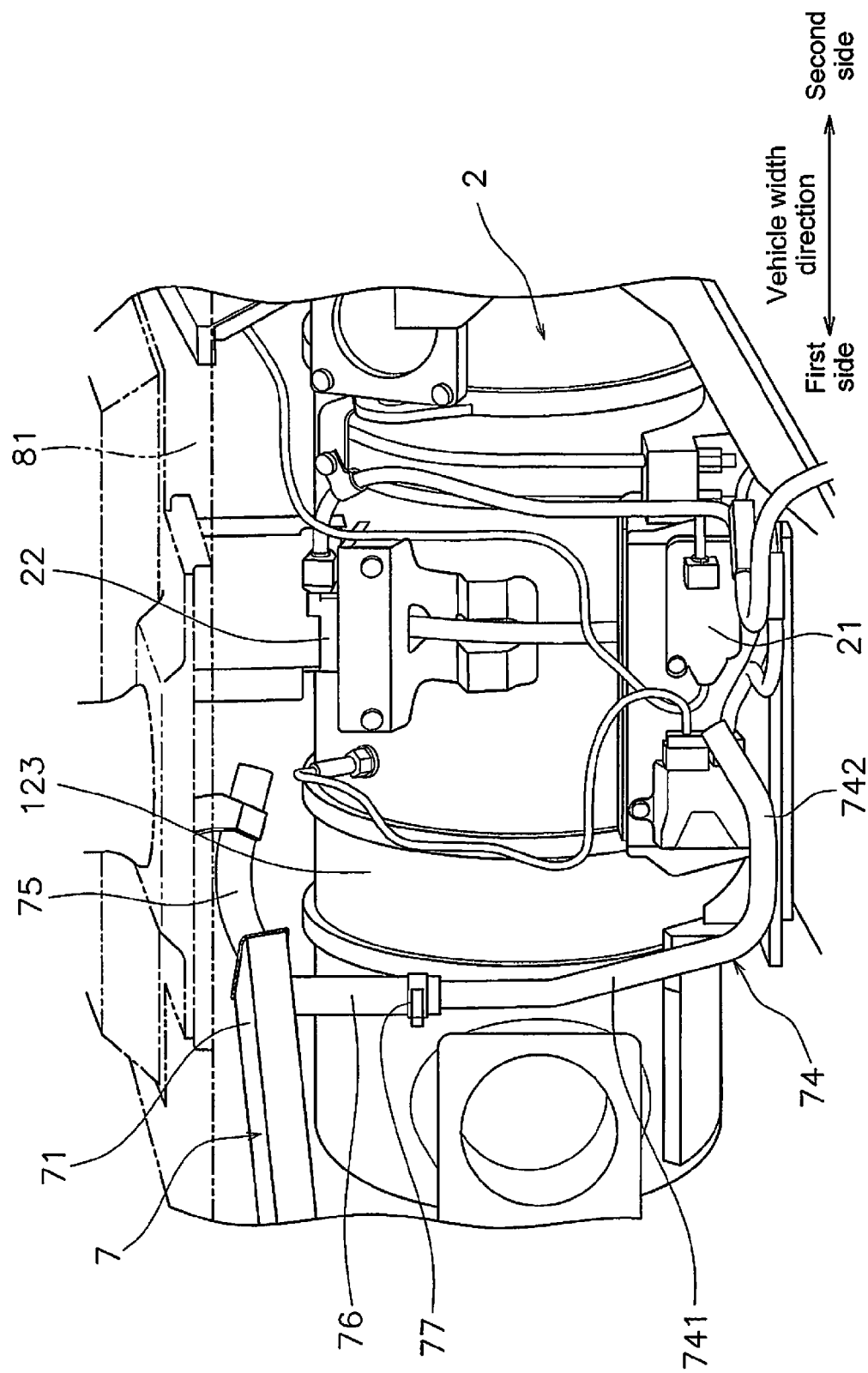
FIG. 8 is a perspective view of the inside of an engine compartment.

FIG. 8 is a perspective view of the inside of the engine compartment 2 in the back view. As illustrated in FIG. 8, the first intake part 74 and the second intake part 75 are connected to the first end part 71 of the first duct body part 70.

The first intake part 74 extends from the first end part 71 of the first duct body part 7 toward a first member to be cooled 21. Specifically, the first intake part 74 is disposed to suck in the air around the first member to be cooled 21. The first member to be cooled 21 is disposed inside the engine compartment 2. In the present exemplary embodiment, the first member to be cooled 21 includes a NOx sensor. The NOx sensor measures the NOx concentration inside the selective catalyst reduction device 123.

The first intake part 74 is attached in a removable manner to the first end part 71 of the first duct body part 7. Specifically, the first intake part 74 is attached to the first end part 71 of the first duct body part 7 via a flexible pipe 76. The pipe 76 can be removed from the first intake part 74 by removing a band member 77. The first intake part 74 is fixed in the inside of the engine compartment 2 with a mounting bracket and the like.

The first intake part 74 has a substantially L-shape. Specifically, the first intake part 74 has a first part 741 that extends downward and a second part 742 that extends in the vehicle width direction. The first part 741 extends downward from the first end part 71 of the first duct body part 7. The second part 742 extends from the lower end part of the first part 741 to the right side (example of the second side). Air around the first member to be cooled 21 is sucked in from the distal end part of the second part 742.

The second intake part 75 extends from the first end part 71 of the first duct body part 7 toward a second member to be cooled 22. Specifically, the second intake part 75 is disposed to suck in the air around the second member to be cooled 22. The second intake part 75 extends from the first end part 71 of the first duct body part 7 to the right side (example of the second side). The second intake part 75 is fixed to the top plate 81 with a mounting bracket and the like. As a result, the second intake part 75 is removed integrally with the top plate 81.

The second member to be cooled 22 is disposed inside the engine compartment 2. In the present exemplary embodiment, the second member to be cooled 22 includes a temperature sensor. The temperature sensor measures the temperature of the selective catalyst reduction device 123. The flow passage area in the first duct body part 7 is larger than the flow passage area of the first intake part 74 and larger than the flow passage area of the second intake part 75.

As illustrated in FIG. 6, the second duct body part 9 has third and fourth end parts 91 and 92. The third end part 91 is positioned inside the engine compartment 2. The fourth end part 92 is positioned inside the cooling compartment 3. The fourth end part 92 is positioned in front of the radiator 4 and the cooling fan 5 in the front-back direction.

As illustrated in FIG. 7, the fourth end part 92 is disposed in a position that does not face the radiator 4 in the back view. Specifically, the fourth end part 92 is positioned in the upper end part and on the right side (the second side) of the center in the vehicle width direction inside the cooling compartment 3. Specifically, the fourth end part 92 is positioned in an upper end part and a right side end part (example of the second side end part) inside the cooling compartment 3. That is, the fourth end part 92 is positioned near the first outdoor air intake port 84 and the third outdoor air intake port 89.

As illustrated in FIG. 4, the second duct body part 9 is attached to the top plate 81. Specifically, the second duct body part 9 is attached to the top plate 81 by a fixing means, such as a mounting bracket or by welding and the like. The second duct body part 9 can be integrally removed with the top plate 81 by removing the top plate 81 from the vehicle frame 150.

Specifically, the rear end part of the second duct body part 9 is supported by the beam member 88. The second duct body part 9 is supported on the beam member 88 by passing through the second through-hole 882. A portion of the left side surface of the second duct body part 9 is welded to the inside surface of the top plate 81.

The second duct body part 9 is disposed in the right side end part (example of the second side end part) inside the engine compartment 2. The cross-section of the second duct body part 9 vertical to the longitudinal direction has a rectangular shape. The second duct body part 9 extends substantially in the front-back direction. The third end part 91 of the second duct body part 9 has an opening that faces the urea water injection device 13. Specifically, the second duct body part 9 mainly extends along the top plate 81 and a portion at the third end part 91 side is configured to face frontward and downward.

As illustrated in FIG. 6, the partition wall 6 has notch parts 61 and 62 for allowing the duct body parts 7 and 9 to pass therethrough. Specifically, the first and second notch parts 61 and 62 are formed in the upper end part of the partition wall 6.

The first notch part 61 is formed in the upper end part and the left side end part (example of the first side end part) of the partition wall 6. The first duct body part 7 extends between the engine compartment 2 and the cooling compartment 3 via the first notch part 61.

The second notch part 62 is formed in the upper end part and the right side end part (example of the second side end part) of the partition wall 6. The second duct body part 9 extends between the engine compartment 2 and the cooling compartment 3 via the second notch part 62.

The wheel loader 100 according to the present exemplary embodiment has the following characteristics.

The second end part 72 of the first duct body part 7 is positioned inside the cooling compartment 3. The cooling compartment 3 is a space with negative pressure when the cooling fan 5 is operating. As a result, the first duct body part 7 sucks in air from the first end part 71 and exhausts the air from the second end part 72. Consequently, hot air inside the engine compartment 2 is exhausted to the cooling compartment 3 and an excessive rise in temperature inside the engine compartment 2 can be suppressed. Since a negative pressure is developed inside the engine compartment 2 due to the hot air inside the engine compartment 2 being exhausted to the cooling compartment 3, outdoor air flows into the engine compartment 2 and the inside of the engine compartment 2 can be cooled. The front part of the top plate 81 has the intake port 811 formed therein for introducing outdoor air into the engine compartment 2.

The second end part 72, the first outdoor air intake port 84, the second outdoor air intake port 87, and the third outdoor air intake port 89 are positioned in front of the radiator 4 and the cooling fan 5 in the front-back direction. As a result, hot air exhausted from the second end part 72 into the cooling compartment 3 becomes mixed with outdoor air sucked into the cooling compartment 3 from the first, second, and third outdoor air intake ports 84, 87, and 89, and the mixed hot air and outdoor air flows toward the radiator 4. Specifically, the direct flow of only the hot air exhausted from the second end part 72 to the radiator 4 is suppressed. As a result, a reduction in the cooling efficiency of the radiator 4 due to the hot air from the second end part 72 can be suppressed.

MODIFIED EXAMPLES

While an exemplary embodiment of the present invention has been described above, the present invention is not limited to the exemplary embodiment and the following modifications may be made within the scope of the present invention.

Modified Example 1

The first and second duct body parts 7 and 9 in the above exemplary embodiment are attached to the top plate 81, but the present invention is not limited as such. That is, the first and second duct body parts 7 and 9 may be separate from the top plate 81 and may not be configured to be removed in an integrated manner with the top plate 81.

Modified Example 2

The entire first outdoor air intake port 84 of the above exemplary embodiment is not limited to being positioned in front of the radiator 4 and the cooling fan 5. For example, at least a portion of the first outdoor air intake port 84 is positioned in front of the radiator 4 and the cooling fan 5 in the front-back direction, and the rear end part of the first outdoor air intake port 84 may be positioned to the rear of the radiator 4.

Modified Example 3

While two duct body parts 7 and 9 are provided in the above exemplary embodiment, the number thereof is not limited. Specifically, only one of the first and second duct body parts 7 and 9 may be provided.

Modified Example 4

Figure 9:
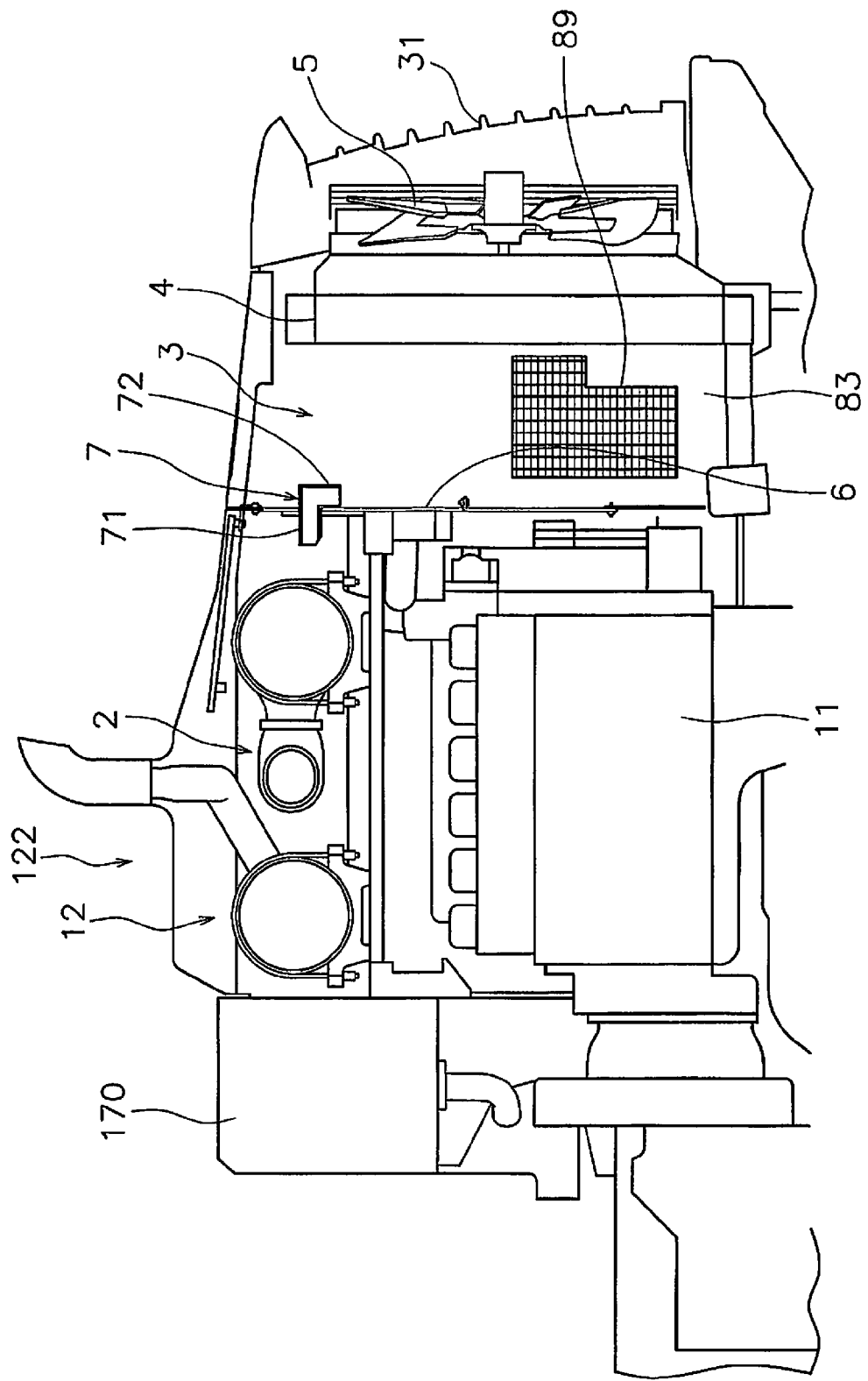
FIG. 9 is a side cross-sectional view of the rear vehicle part according to a fourth modified example.

As illustrated in FIG. 9, the second end part 72 of the first duct body part 7 may be configured to open downwards. According to this configuration, rainwater that enters into the cooling compartment 3 may be prevented from entering into the engine compartment 2 through the first duct body part 7. The first end part 71 of the first duct body part 7 is positioned inside the engine compartment 2 in the vicinity of a partition wall 6. The first duct body part 7 passes through the partition wall 6.

Modified Example 5

While three outdoor air intake ports 84, 87 and 89 are formed in the above exemplary embodiment, the number of the outdoor air intake ports is not limited to three. For example, only one of the first, second, and third outdoor air intake ports 84, 87, and 89 may be formed.

Modified Example 6

A diesel oxidation catalyst (DOC) may also be disposed in the position of the diesel particulate filtering device 121 in the above exemplary embodiment.

Modified Example 7

While the wheel loader 100 to which the present invention is applied has been described in the above exemplary embodiment, the present invention may be applicable to another work vehicle, such as a motor grader.

What is claimed is:
1. A work vehicle comprising:
an engine compartment;
a cooling compartment;
a radiator contained in the cooling compartment;
a partition wall that partitions the engine compartment from the cooling compartment;
a cooling fan contained in the cooling compartment for exhausting air from the cooling compartment;
a first duct body part that has a first end part positioned inside the engine compartment and a second end part positioned inside the cooling compartment between the radiator and the partition wall; and a vehicle body cover for defining the cooling compartment and having an outdoor air intake port formed in front of the radiator and the cooling fan.

2. The work vehicle according to claim 1, wherein the second end part is disposed in a position that does not face the radiator in a back view.

3. The work vehicle according to claim 1, further comprising
a second duct body part that has a third end part positioned inside the engine compartment and a fourth end part positioned inside the cooling compartment in front of the radiator and the cooling fan.

4. The work vehicle according to claim 3, wherein the fourth end part is disposed in a position that does not face the radiator in a back view.

5. The work vehicle according to claim 3, wherein the second end part is positioned in an upper end part of the cooling compartment and toward a first side of the cooling compartment relative to a widthwise center of the cooling compartment in a vehicle width direction; and
the fourth end part is positioned in the upper end part of the cooling compartment and toward a second side of the cooling compartment relative to the widthwise center of the cooling compartment in the vehicle width direction.

6. The work vehicle according to claim 3, wherein the second end part is positioned in a first side end part and in an upper end part of the cooling compartment; and
the fourth end part is positioned in a second side end part and in the upper end part of the cooling compartment.

7. The work vehicle according to claim 1, wherein the vehicle body cover has a top plate that defines an upper surface of the engine compartment;
and the outdoor air intake port is formed in the top plate.

8. The work vehicle according to claim 1, further comprising
a first member to be cooled disposed inside the engine compartment; and
a first intake part that extends from the first end part of the first duct body part toward the first member to be cooled.

9. The work vehicle according to claim 8, wherein the first intake part is attached in a removable manner to the first end part of the first duct body part.

10. The work vehicle according to claim 8, further comprising
a second member to be cooled disposed inside the engine compartment; and
a second intake part that extends from the first end part of the first duct body part toward the second member to be cooled.

11. The work vehicle according to claim 10, wherein a flow passage area in the first duct body part is larger than a flow passage area of the first intake part and larger than a flow passage area of the second intake part.

12. The work vehicle according to claim 1, wherein the second end part of the first duct body part has an opening facing downwards.

* * * * *